United States Patent [19]

Kloss, Jr.

[11] Patent Number: 5,198,291

[45] Date of Patent: Mar. 30, 1993

[54] HIGH PERFORMANCE REINFORCED INSULATION JACKETING/BLANKETING MATERIAL

[75] Inventor: Thomas M. Kloss, Jr., Tempe, Ariz.

[73] Assignee: Tomark Industries, Inc., Tempe, Ariz.

[21] Appl. No.: 529,181

[22] Filed: May 25, 1990

[51] Int. Cl.$^5$ .................... D04H 1/58; B32B 27/06
[52] U.S. Cl. ................................ 428/288; 428/336; 428/421
[58] Field of Search ............... 428/287, 422, 421, 288, 428/336, 34.1, 36.91

[56] References Cited

U.S. PATENT DOCUMENTS

| | | | |
|---|---|---|---|
| 4,329,399 | 5/1982 | Swerlick | 428/422 |
| 4,360,554 | 11/1982 | Campbell et al. | 428/287 X |
| 4,778,723 | 10/1988 | Carl et al. | 428/422 X |

Primary Examiner—Thomas J. Herbert, Jr.

[57] ABSTRACT

High performance thermoplastic film/fiber composite for the outer protective covering of fibrous insulation and acoustic materials is comprised of oriented fluoropolymer film to achieve chemical resistance, environmental stability, non-flammability, moisture resistance, capable of being fabricated by multiple methods with a preferred use in commercial, military and private aircraft insulating systems.

3 Claims, 1 Drawing Sheet

HIGH PERFORMANCE REINFORCED INSULATION JACKETING/BLANKETING MATERIAL

BACKGROUND OF THE INVENTION

This invention relates to improvements in reinforced surfacing materials used for covering fibrous insulation (fiberglass, etc.) used by aircraft manufacturers for thermal and acoustic properties. This outer containment skin or surfacing material is referred to as jacketing or blanketing.

In the manufacture of commercial, military and private aircraft, structural surfaces such as the fuselage are covered with fibrous insulating materials between the ribs (support beams) on the inside, similar to buildings, housing, etc. between studs. Jacketing materials are used to protect, contain and provide shape to this fibrous material and facilitate installation on contour surfaces. These jacketing materials are reinforced with threads mounted to the surface of the jacketing film in a two directional pattern to prevent tear propagation when wrapped around the fibrous material and mounted into the aircraft using fasteners that must puncture the jacketing and insulation to hold it in place.

Among the problems found in existing jacketing material were lack of resistance to chemicals (fuels and septic tank solutions, etc.), decomposition in environmental changes (ambient to below freezing temperature changes on a continuous cycle), poor moisture resistance (allowing moisture to permeate through the jacket into fibrous materials causing lack of performance and degradation of insulation), high flammability of current materials (although not Federally regulated a desire in any material used for commercial aviation), and labor-intensive fabrication methods for jacketing using seamstress methods.

Accordingly, it is an object of this invention to provide a jacketing material resistant to all chemicals, sealants, etc. associated with aircraft maintenance and operation.

It is also an object of this invention to provide a jacketing material that is not affected by thermal cycling from ambient to below freezing on a continuous basis for a period of time that exceeds the expected life of the aircraft.

It is a further object of this invention to provide a jacketing material that does not allow moisture to permeate through to the fibrous material it is intended to protect.

It is another object of this invention to provide a jacketing material that is non-flammable.

Yet another objective of this invention is to provide a jacketing material that can be fabricated and installed in more ways than current material, thereby taking advantage of improved, efficient and cost-effective techniques.

ADVANTAGES OF THE INVENTION

Briefly, there is provided to achieve the foregoing objectives a fluoropolymer film layer in which the film characteristics have been significantly enhanced through a process known as orientation. Orientation is the stretching of a film above its glass transition temperature, but below its melt temperature, which partially aligns the molecules and improves the physical properties. The fluoropolymer layer is then inert to strong mineral acids, inorganic bases, halogens and metal salt solutions, impervious to thermal cycling with continuous use rating of 150° C. (302° F.), lower in permeability to common gases and vapors, is non-flammable, and can employ fabrication and installation methods such as heat sealability and ultrasonic welding in addition to the current stitching method.

DECRIPTION OF PREFERRED EMBODIMENT

Figure 1:
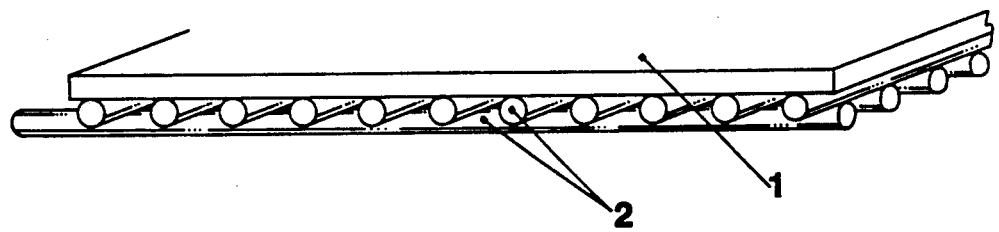
FIG. 1 is a representation of an enlarged cross section of the insulation jacketing material.
Figure 2:
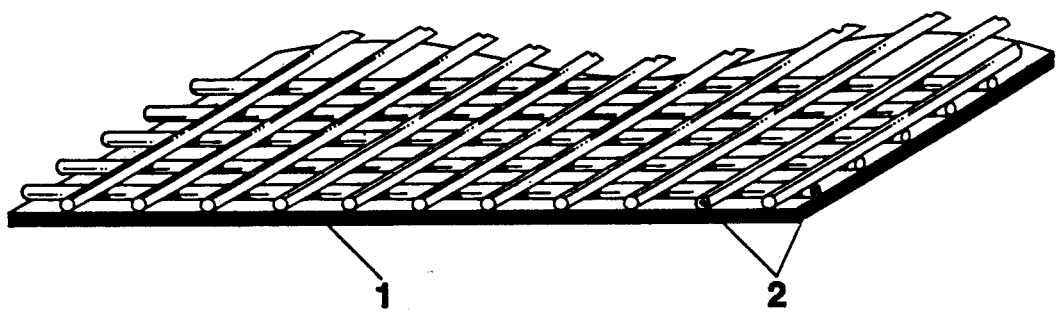
FIG. 2 is a representation of the insulation jacketing material with example of typical thread pattern.

Attention is now invited to FIGS. 1 and 2 where a presently preferred embodiment of the improved material is shown as Layer 1 of oriented ethylene-tetrafluoroethylene (ETFE), which can be obtained from E. I. Du Pont De Nemours & Company (Inc.) under the trademark Tefzel-2 in thicknesses between 0.0003 and 0.002 thousandths of an inch. Other suitable materials are polytetrafluoroethylene, perfluoroalloxy fluorocarbon and chlorotrifluoroethylene which can also be obtained from the Du Pont Company.

Layer 2 consists of the multi-directional fiber threads used for the reinforcement to prevent tear propagation. The preferred embodiment consists of nylon thread spaced evenly in the machine and transverse direction at 10 counts per inch. Other suitable threads consist of Polyester, Fiberglass, Kevlar, Graphite, Carbon and Quartz. Additionally, the count (number of threads per inch) can be altered in the machine at transverse direction balancing strength and weight considerations or be mounted diagonally to produce other suitable materials.

Figure 3:
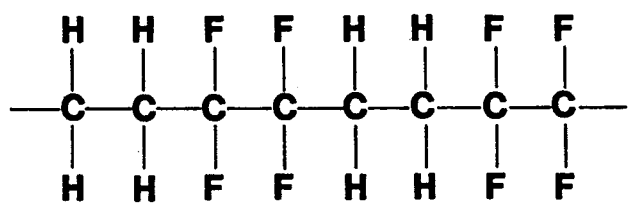
FIG. 3 is a representation of the molecular structure of ethylene-tetrafluoroethylene fluoropolymer film, Tefzel-2, producing the physical properties in the invention.

This invention utilizing oriented fluoropolymer film such as ETFE is a major advancement in the requirement for high performance materials used in restricted environments such as aircraft insulation jacketing. FIG. 3 demonstrates the chemical compounds and molecular structure of ethylene-tetrafluoroethylene.

This ETFE is inert to all known chemicals and other liquid agents associated with aircraft maintenance and repair providing superior protection over materials now used in jacketing.

Altitude changes creating a thermocycling effect of continuous change in temperature from one extreme (below freezing) to another (ground ambient), is a modern day problem in the airline industry as a result of deregulation. Competitive forces have created maximum utilization of the aircraft. Additionally, the Hub system (limited direct flights) has significantly increased take off and landing of each aircraft on a daily basis. Longer hours and more flights per aircraft have dramatically accelerated thermocycling causing current material to breakdown in composition. ETFE is impervious to thermocycling due to a melt temperature of 520 degrees F. and its ability to remain flexible in cryogenic temperatures. This cycling will not affect any ETFE physical property during its life expectancy which is calculated to be longer than that of the aircraft at 20 years service.

Moisture-vapor transition is a serious problem in current jacketing materials as condensation occurs during the thermocycling stage, based on humidity. It is estimated that in excess of 3,000 pounds of water can be absorbed and trapped in fibrous insulation due in part to the high moisture-vapor transmission rates of current materials. Other causes of moisture problems include puncture in mounting and inadequate technique to repair on site. Through the orientation of ETFE, moisture transmission values are reduced by five (5) to ten (10) times that of current jacketing material due to the increased crystallization of the film caused by the orientation process. This reduction will minimize additional weight of the aircraft, thereby creating fuel economies in travel as well as safety margins in fuel/distance/-weight calculations. This moisture creates another dangerous situation. Trapped in the insulation for extended periods of time, this moisture leads to corrosion problems in the aircraft itself. This problem can have a devastating affect on airworthiness and safety.

Flammability has become a major safety issue in air travel over the past five years with Federal Regulations now in effect regarding commercial passenger safety. Although these regulations are specifically targeted for passenger interiors, not insulation, aircraft manufacturers are seeking non-flammability as a standard on all non-metallic materials associated with constructing the aircraft. This invention has a limited oxygen index of thirty (30) percent, which means it needs an environment with more oxygen in it than normal atmosphere, twenty (20) percent, to burn. This property alone is a material breakthrough for the industry from a passenger safety issue, especially in view of the fact that the insulation jacket is in direct contact with the regulated interior materials. Nonburning is a result of chemical makeup of fluoride.

Fabrication of current materials is a very labor intensive and costly operation involving scissor cutting, edge folding, sewing with machines and hand stitching. This invention, by use of the ETFE Polymer allows for the utilization of low cost, high speed methods of fabrication. Because it is a true thermoplastic, heat sealing equipment can melt the polymer together, ultrasonic welding can also fuse the polymer to itself. Site repairs to rips and tears in construction and maintenance are also achievable, and these new methods while significantly reducing cost, will contribute to solving moisture problems.

CONCLUSION

This invention represents a major advancement in material design providing high performance, stable and flexible insulation surfacing material used in chemically and thermally harsh environments. The nonburning characteristics, advanced personal safety and the reduction in moisture vapor transmission extend the service life of both the fibrous insulation and the aircraft. Although targeted for the aircraft industry, applications could exist in aerospace, automotive, transportation, building and construction trades and other difficult environments.

What is claimed is:

1. A reinforced jacketing material for bagging insulation comprised of an oriented fluoropolymer film, of 5 microns up to 20 microns in thickness, providing an increased resistance to the harsh chemical and thermal environment it is exposed to, and a layer of multidirectional fiber threads for reinforcement to prevent tear propagation.

2. A reinforced jacketing material for bagging insulation of claim no. 1 wherein said fluoropolymer film is inert to strong mineral acids, inorganic bases, halogens and metal salt solutions and little effect by carboxylic acids, anhydrides, aromatic and aliphatic hydrocarbons, alcohols, aldehydes, ketones, estons, chlorocarbons and classic polymer solvents.

3. A reinforced jacketing material for bagging insulation of claim no. 1 wherein said fluoropolymer film is capable of continuous use operating temperature of 150° C. (302° F.)

* * * * *